United States Patent [19]

Yamaguchi et al.

[11] Patent Number: 4,797,990
[45] Date of Patent: Jan. 17, 1989

[54] VERTICAL MACHINING CENTER WITH A ROTARY PALLET CHANGER

[75] Inventors: Yoshinori Yamaguchi, Sakuraishi; Soichi Nishiyama, Nagagun; Norihide Maeda, Kashiwarashi; Masayasu Miyoshi, Yamatokoriyamashi, all of Japan

[73] Assignee: Kabushiki Kaisha Mori Seiki Sisakusho, Nara, Japan

[21] Appl. No.: 104,383

[22] Filed: Oct. 5, 1987

[30] Foreign Application Priority Data

Oct. 24, 1986 [JP] Japan .................. 61-254299

[51] Int. Cl.⁴ .................. B23Q 3/156; B23C 1/14
[52] U.S. Cl. .................. 29/568; 198/339.1; 409/198
[58] Field of Search .................. 29/563, 33 P, 568; 198/339.1, 345, 346.2, 346.1, 803.2; 409/189, 190, 197, 198, 163, 172, 219

[56] References Cited

U.S. PATENT DOCUMENTS

| | | | |
|---|---|---|---|
| 4,090,287 | 5/1978 | Selander | 29/568 |
| 4,133,423 | 1/1979 | Zankl | 29/563 |
| 4,480,738 | 11/1984 | Mattson | 198/339 |
| 4,512,068 | 4/1985 | Piotrowski | 29/563 X |
| 4,564,995 | 1/1986 | Kase | 29/563 |
| 4,637,108 | 1/1987 | Murata et al. | 29/33 P |
| 4,679,286 | 7/1987 | Momio et al. | 29/33 P |

FOREIGN PATENT DOCUMENTS

| | | | |
|---|---|---|---|
| 623707 | 9/1978 | U.S.S.R. | 29/563 |
| 1202363 | 8/1970 | United Kingdom | 29/33 P |

Primary Examiner—William R. Briggs
Attorney, Agent, or Firm—Antonelli, Terry & Wands

[57] ABSTRACT

A vertical machining center equipped with a rotary pallet changer, the center comprising a pallet clamp unit provided along the front face of the bed, with the clamp unit holding a pallet in a vertical position, and being capable of rotating around a horizontal axis. A rotary pallet changer provided in front of a front face of a bed of the vertical machining center, a saddle provided on an upper surface of the bed. The being saddle is slidable along the X axis, and a column is provided on a top surface of the saddle, with the column being slidable along the Y axis. A headstock is provided on a front face of the column with the headstock being slidable along the Z axis. A tool magazine and an automatic tool exchange device are arranged alongside the bed with a numerical control unit being provided for numerically controlling the saddle, the column, the headstock, the pallet clamp unit, the rotary pallet changer, the tool magazine and the automatic tool exchange device.

2 Claims, 7 Drawing Sheets

VERTICAL MACHINING CENTER WITH A ROTARY PALLET CHANGER

BACKGROUND OF THE INVENTION

1. Field of the Invention

The present invention relates to a vertical machining center adapted for use in the production mechanical components, and, more particularly, to a vertical machining center having a rotary pallet changer, with the machining center being adapted for incorporation in the versatile system intended for the production of a variety of components in small quantity.

2. Description of the Prior Art

It is generally known that the machining center is the most important of the numerical control (NC) machine tools. However, the conventional machining centers are generally large and, as a practical matter, is reflected matter of course the large size reflects in the total price. When several machining centers are systematized into a production line, the site allows of no room for the conveyors of appropriate size and as is apparent, conveyors of small sizes have limited capabilities. To achieve the full automatic versatile system in an unmanned factory, a large space must be prepared for accommodating the large-sized system. Considering the price of property a large investment will be required thereby representing a bottleneck to the development of versatile manufacturing systems.

The aim underlying the present invention essentially resides in providing a vertical machining center of compact size and simplified construction which is capable of being economically manufactured but nevertheless provides an improved efficiency.

In accordance with advantageous features of the present invention, a vertical machining center is provided which includes a rotary pallet changer, with the machining center comprising: A pallet clamp unit provided along the front face of the bed, of the machine, with the clamp unit holding a pallet in a vertical position, and being capable of rotating around a horizontal axis for the purpose of indexing the pallet. A rotary pallet changer is provided in front of the front face of the bed, with a saddle being provided on the upper surface of the bed, which saddle is slidable along the X axis. A column is provided on a top surface of the saddle, with the column being slidable along the Y axis. A headstock is provided on the front face of the column, with the headstock being slidable along the Z axis. A tool magazine and an automatic tool exchange device are arranged alongside the bed, with a numerical control unit being provided for numerically controlling the saddle, the column, the headstock, the pallet clamp unit, the rotary pallet changer, the tool magazine and the automatic tool exchange device.

The above and other objects, features, and advantages of the present invention will become more apparent from the following description when taken in connection with the accompanying drawings which show, for the purpose of illustration only, one embodiment in accordance with the present invention.

DETAILED DESCRIPTION OF THE INVENTION

Figure 1:
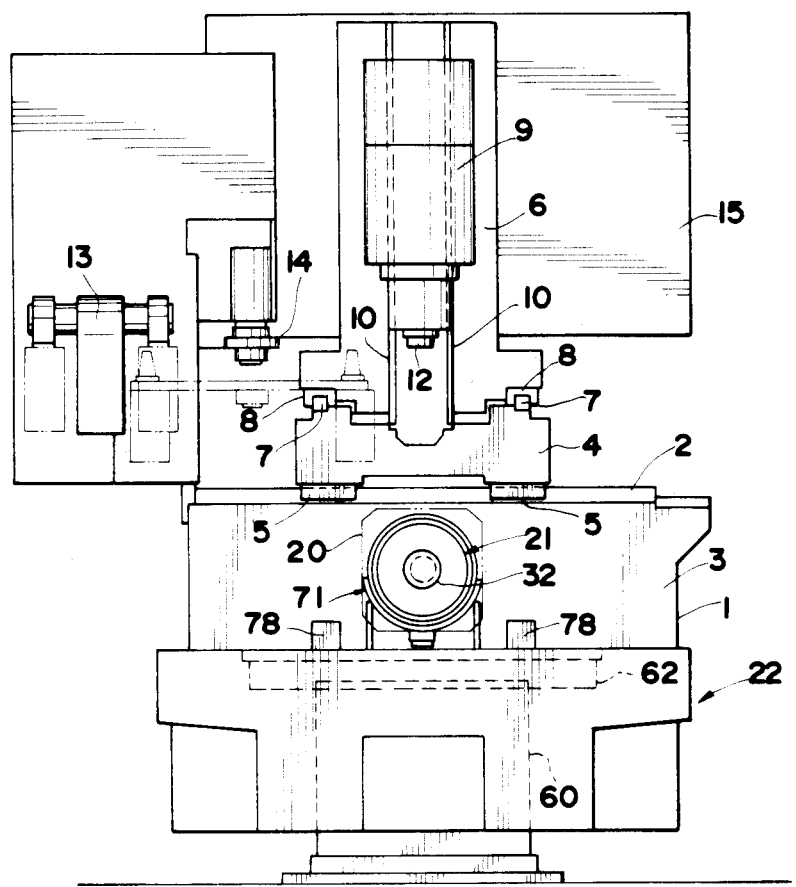
FIG. 1 is a front view of a vertical machining center constructed in accordance with the present invention.

Referring now to the drawings wherein like reference numerals are used throughout the various views to designate line part and, more particularly, to FIG. 1, according to this figure, a vertical machining center according to the present invention includes a bed 1 provided with a horizontal linear guide. The bed 1 includes a clamp unit 21 for a pallet 20 and a rotary pallet changer 22 on a front face thereof. A saddle 4 is movably fixed to the linear guide 2 through a bearing 5, with the saddle being caused to move along an X axis, that is, to the right and left in FIG. 1. A column 6 is movably fixed to a second linear guide 7 provided on the saddle 4 through a bearing 8. The column 6 is movable along the Y axis, that is, perpendicular to the plane of the drawing. A headstock 9 is provided on the column 6, with the headstock 9 being movable along the X axis, that is, upward and downwardly in FIG. 2. There are provided bearings 11 slidable along a third linear guide 10, and the headstock 9 incorporates an electric motor (not shown). A main shaft 12 is directly connected to the motor shaft without the use of any intermediate means, such as, for example, belts or gears. The saddle 4, the column 6, and the headstock 9 are operated independently of each other in a known manner by, for example, the use of a servomotor.

The bed 1 is provided with a tool magazine 13, and an automatic tool exchange device 14 of a known system, such as a twin-arm system. The machine incorporates an NC (numerical control) device 15, which controls the saddle 4, the column 6, the headstock 9, the tool magazine 13, the tool exchange device 14, the pallet clamp unit 21 and the changer 22.

Figure 3:
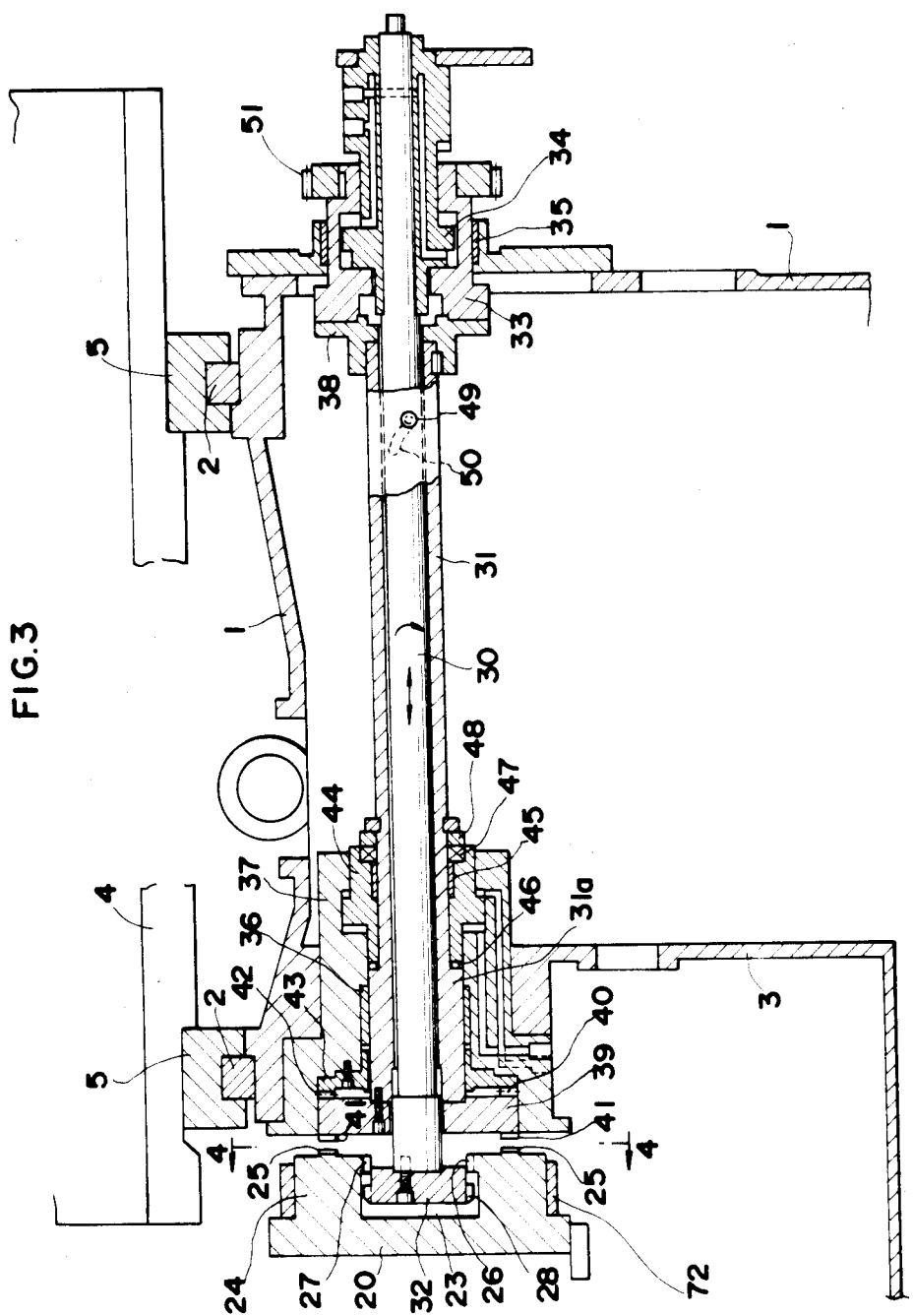
FIG. 3 is a cross-sectional side view showing a part of the pallet clamp unit included in the machining center of the present invention.
Figure 4:
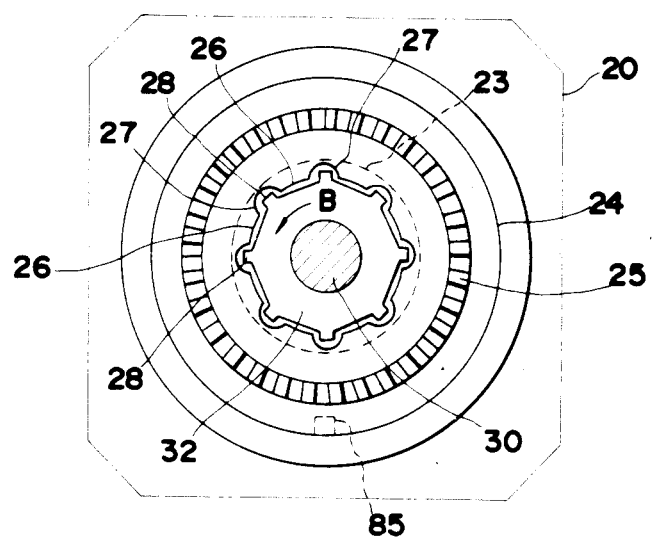
FIG. 4 is a view of an end face taken along the line 4—4 in FIG. 3.

Referring to FIGS. 3 and 4 the pallet clamp unit 21 will be described in greater detail:

The pallet 20 has a square shape with each corner being cut, and is provided with a recess 23 in its back, the recess 23 being adapted to receive a clamp plate 32 as best shown in FIG. 3, wherein the reference numeral 24 denotes a shoulder thereof having ring-shaped teeth 25 on its end face. The recess 23 is provided with a plurality of projecting edges 26 with broken parts 27 interposed between adjacent projecting edges 26 as shown in FIG. 4. A workpiece (not shown) is fixed to the front face of the pallet 20.

The clamp unit 21 includes a shaft 30 horizontally carried by the bed 1 in such a manner that its one end projects through the front face 3 of the bed, and an index spindle 31 telescopically carried on the shaft 30 for relative movement. The clamp plate 32 is fixed to the projecting end of the shaft 30, with the clamp plate 32 having a round cross-section. The shaft 30 is connected to a piston 34 of a hydraulic cylinder 33 at its opposite end thereof, with the hydraulic cylinder 33 being slidably carried on the bed 1 through a metal sleeve or bush 35 in such a manner that it can rotate and axially slide.

The index spindle 31 has a bulged portion 31a which is rotatively and slidably carried on a second hydraulic cylinder 37 through a metal sleeve or bush 36, and is connected to the first hydraulic cylinder 33 through a flange 38 at the opposite end to the bulged portion 31a, which has an index plate 39 fixed thereto on its front face. The index plate 39 is provided with ring-shaped index teeth 40 on its inner side and with teeth 41 engageable with the teeth 25 of the pallet 20 on the outer side. The index teeth 40 are engageable with teeth 42 provided on a ring 43 connected to the front face of the second hydraulic cylinder 37.

The second hydraulic cylinder 37 has a hollow cylindrical piston 44 which is telescopically carried on the index spindle 31 through a metal sleeve or bush 45 for relative rotation. The front end of the piston 44 is engaged with the bulged portion 31a of the index spindle through a thrust bearing 46, and the rear end thereof is engaged with a collar 48 secured to the index spindle 31 through a thrust bearing 47. The piston 44 is prevented from rotation with respect to the second hydraulic cylinder 37. In this way the piston 44 and the index spindle 31 are rotatable relative to each other, but the piston 44 is prevented from an axial movement whereas the index spindle 31 is axially movable. The index spindle 31 has a pin 49 fixed to its rear end. The pin 49 protrudes inside and fits in a cam groove 50 produced on the outside of the clamp shaft 30 so that, during the movement of the clamp shaft 30 between the clamping position and the unclamping position, it axially moves, and slightly rotates.

The index spindle 31 is rotated by a rotary gear 49 secured to the rear end of the first hydraulic cylinder 33 by the use of a suitable driving means.

Figure 6:
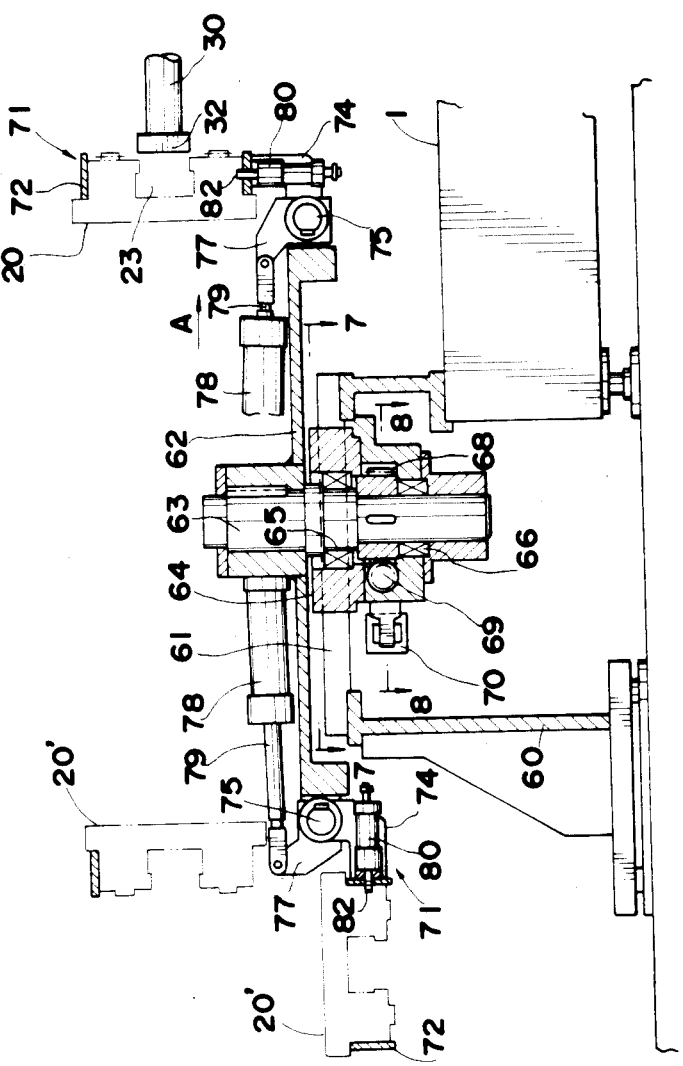
FIG. 6 is a cross-sectional view of a main portion of the rotary pallet changer.
Figure 7:
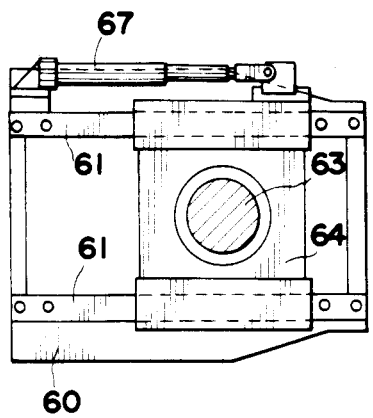
FIG. 7 is a view of an end face taken along the line 7—7 in FIG. 6.

Referring to FIGS. 5 to 9 the rotary pallet changer 22 will be described in detail:

The rotary pallet changer 22 includes a base 60 disposed in front of the front face 3 of the bed 1. As shown in FIGS. 6 and 7 there are provided a pair of guide bars 61 on the base 60, the guide bars 61 extending in parallel with the clamp shaft 30 of the clamp unit 21. A rotary table 62 includes has a rotary shaft 63 pivotally connected to a moving casing 64 slidably carried on the guide bars 61 through bearings 65, 66. The moving casing 64 is reciprocated along the guide bars 61 by a hydraulic cylinder 67 provided on a side wall of the base 60 so as to cause the rotary table 62 to come near or away from the pallet clamp unit 21.

Figure 8:
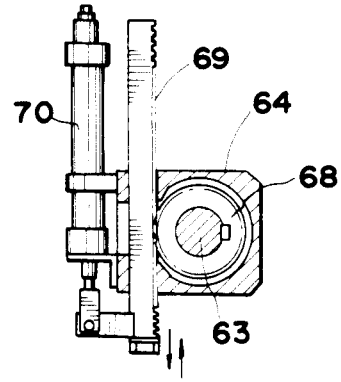
FIG. 8 is a cross-sectional view taken along the line 8—8 is FIG. 6.

As shown in FIGS. 6 and 8, the rotary shaft 63 is provided with a gear 68 in a middle portion thereof, whereby the rotary shaft 63 is rotated. A rack 69 is engaged with the gear 68, with the rack 69 being slidably connected to the moving casing 64. The rack 69 is reciprocated by a hydraulic cylinder 70, thereby rotating the gear 68. In accordance with the rotation of the gear 68, the rotary table 62 rotates around the shaft 63 at 180°.

Diametrically disposed pallet holding holding frames 71 are provided with each pallet holding frame 71 including a holder ring 72 in which the shoulder 24 of the pallet 20 rotatively fits, and the holder ring 72 is fixed to arms 74 joined to the opposite ends of a sleeve 73. A support 75 is keyed to the inside wall of each sleeve 73. The rotary table 62 is provided with a pair of diametrically opposed brackets 76 which bear the support 75 in a rotative manner. The support 75 is provided with an arm 77 to which a piston rod 79 of the hydraulic cylinder 78 is connected. In this way, the hydraulic cylinder 78 causes the holder ring 72 to tilt around the support 75 from a horizontal position to a vertical position and vice versa.

Figure 9:
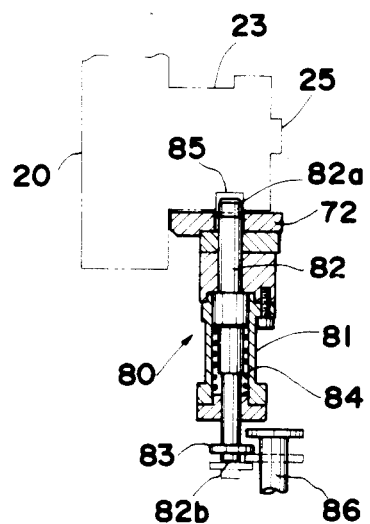
FIG. 9 is a cross-sectional view, on an enlarged scale, of a pallet stopper unit constructed in accordance with the present invention.

A pallet holder 80 is joined to the ring 72. As shown in FIG. 9, a hydraulic cylinder 81 joined to the ring 72, has a slidable pin 82, which projects inward through the ring 72 at one end 82a, whereas, it projects through the cylinder 81 at the other end 82b. The pin 82 is provided with a ring-shaped flange 83 at the end 82b. The pin 82 is urged to project upward of the ring 72 by a spring 84 housed in the cylinder 81. The projecting end 82a of the pin is designed to fit in a recess 85 produced in the shoulder 24 of the pallet 20. By ensuring that the projecting end 82a of the pin fits in the recess 85 of the pallet shoulder 24, the pallet 20 is exactly positioned and secured to the ring 72. When the pallet 20 is to be released fron the ring 72, an arm 86 is caused to engage the ring-shaped flange 83 of the lower end 82b of the pin, and pulls it down against the spring 84.

Figure 2:
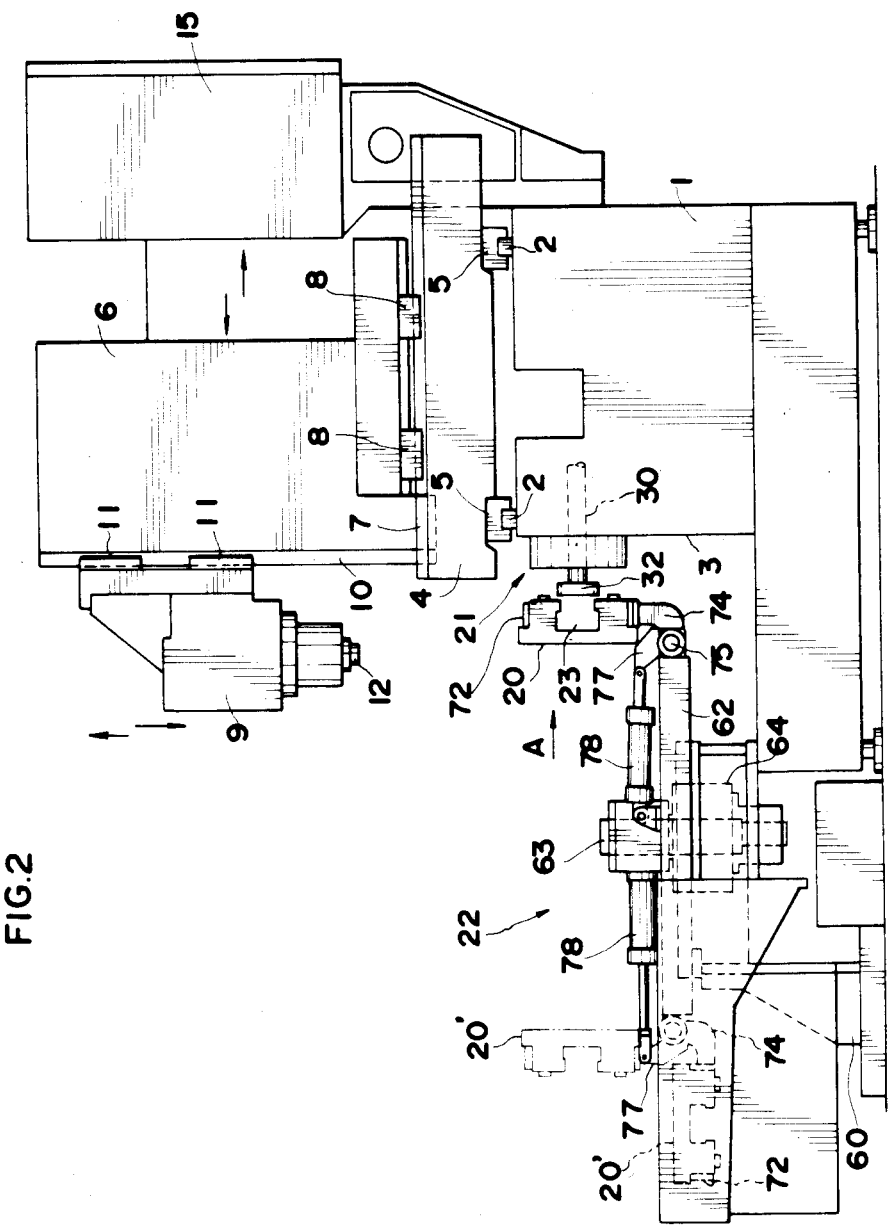
FIG. 2 is a right-hand side view of the machining center of FIG. 1.
Figure 5:
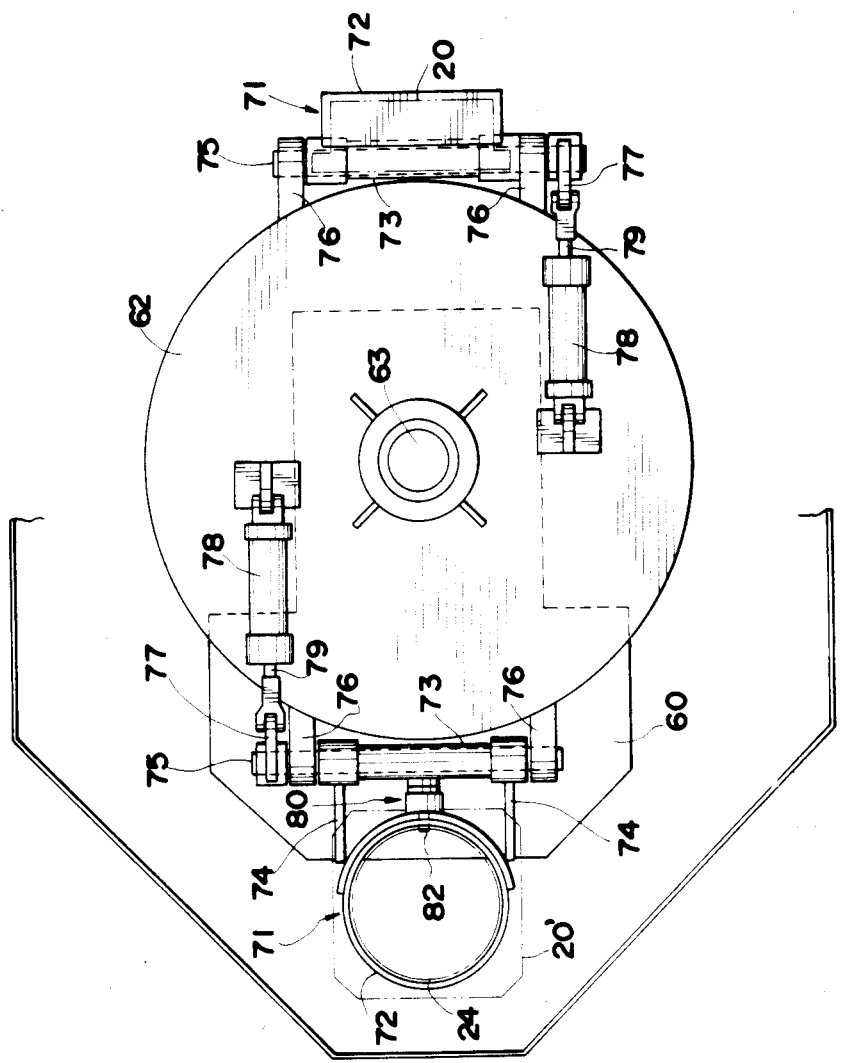
FIG. 5 is a plan view of a rotary pallet changer constructed in accordance with the present invention.

An example of the operation of the clamp unit 21 and the changer 22 will be described:

FIGS. 2, 4 and 5 show a state in which one of the pallet holding frames 71 is maintained in its vertical position so that the pallet 20 secured by the ring 72 is faces the clamp unit 21, and in which the hydraulic cylinder 67 is operated so that the moving casing 64, the rotary table 62 and the pallet 20 come near the clamp unit 21.

When the pallet 20 comes near the clamp unit 21, the projections 28 of the clamp plate 32 freely fit in the broken parts 27, thereby securing a firm union of the clamp plate 32 and the recess 23 of the pallet 20. At this stage the pin 82 is withdrawn from the recess 85 of the pallet 20, and the pallet 20 is rotatively held on the ring 72.

Then the piston 34 of the hydraulic cylinder 33 is moved rearwardly, thereby causing the clamp shaft 30 to move rearwardly in the axial direction, and to rotate slightly by engagement of the pin 49 with the cam groove 50. In accordance with the rotation of the clamp shaft 30, the clamp plate 32 rotates in the direction of arrow (B) in FIG. 4, thereby causing the projections 28 to engage the projecting edges 26. As a result, the pallet 20 is withdrawn toward the index plate 39 through the pallet 20, thereby enabling the teeth 25 to engage the teeth 41 of the index plate 39. At this stage other teeth 40 of the index plate 39 are engaged with the teeth 42 of the ring 43. In this way the pallet 20 becomes fixed to the hydraulic cylinder 37 which is integral with the bed 1 through the ring 43. In this "clamped state" of the pallet 20. In, the saddle 4, the column 6 and the headstock 9 are moved along the X, Y and Z axis, respectively. During the movement of the headstock 9, the tool (not shown) mounted on the main shaft 12 thereof cuts the workpiece (not shown).

When another side of the workpiece is to be cut by the tool, the piston 44 of the hydraulic cylinder 37 is moved forward, wherein the teeth 25 of the pallet 20 are maintained in engagement with the teeth 41 of the index plate 39. As the piston 44 moves forward the index spindle 31 and the clamp shaft 30 protrude together, thereby disengaging the teeth 40 of the index plate 39 from the teeth 42 of the ring 43. In this state the drive is imparted to the index spindle 31 through the gear 49, thereby causing the index spindle 31 to rotate. In association with the rotation of the spindle 31 the pallet 20 is rotated at a desired angle for indexing purpose. After the indexing rotation is finished the piston 44 returns, and the index spindle 31 also withdraws. In this way the teeth 40 of the index plate 39 come into engagement with the teeth 42, thereby restoring the clamping state. By repeating the clamping and indexing process the workpiece mounted on the pallet is cut in its four faces.

While the workpiece is being cut a fresh pallet 20', holding the next workpiece, is given to the other pallet holding frame 71, wherein the fresh pallet 20' is held by the ring 72 in the above-mentioned manner.

After the workpiece placed on the pallet 20 is processed, the hydraulic cylinder 33 is operated to advance the clamp shaft 30 by its piston 34, and in association with the advancement of the clamp shaft 30 the pallet 20 moves forward, thereby disengaging the teeth 25 from the teeth 41 that is, the unclamping state is effected. At this moment the clamp shaft 30 slightly rotates by engagement of the pin 49 with the cam groove 50. The original state in which the projections 28 are faced to the broken parts 27 is restored. Then the hydraulic cylinder 67 is operated to cause the moving casing 64 and the rotary table 62 to retreat along the guide bar 61, thereby releasing the pallet 20 from the clamp plate 32. The pallet holding frame 71 is also disengaged from the clamp plate 21.

The other pallet holding frame 71 holding the pallet 20', maintained in a horizontal position is caused to be moved into an vertical position as shown by the dotted lines in FIGS. 2 and 6, and then the hydraulic cylinder 70 is operated to rotate the rotary table 62 at 180°, thereby allowing the pallet 20' to be positioned in opposition to the clamp unit 21. The other pallet 20 holding a finished workpiece is released from the ring 72 by tilting the holding frame 71 to its horizontal position.

The above-described procedure is repeated with a timely supply of appropriate tools from the automatic tool exchanger 14. In this way a variety of workpieces are automatically processed.

What is claimed is:

1. A vertical machining center the vertical machining center comprising:
    a machine bed having a front face;
    a pallet clamp unit provided along the front face of the bed, the pallet clamp unit holding a pallet in a vertical position, and being capable of rotating around a horizontal axis;
    a rotary pallet changer provided in front of the front face of the bed;
    a saddle provided on an upper surface of the bed, the saddle being slidable along an X axis;
    a column provided on a top surface of the saddle, the column being slidable along a Y axis;
    a headstock provided on a front face of the column, the headstock being slidable along a Z axis;
    A tool magazine and an automatic tool exchange device, arranged alongside the bed; and
    a numerical control unit for numerically controlling the saddle, the column, the headstock, the pallet clamp unit, the rotary pallet changer, the tool magazine and the automatic tool exchange device.

2. A vertical machining center as defined in claim 1, wherein the rotary pallet changer comprises a rotary table, at least two pallet holding frames and means for shifting the pallet holding frame, the rotary table being capable of rotating around a vertical axis, the pallet holding frame being capable of changing from a vertical position to an horizontal position and vice versa with respect to the rotary table so that in the horizontal position it holds the pallet after being changed to the vertical position, it is rotated and moved until it is disposed in a position opposite to the pallet clamp unit, and means for causing the pallet holding frame situated at the opposite position to come near or become separated from the clamp unit, thereby enabling the pallet rotatively held by the pallet holding frame to become clamped to the pallet clamp unit

* * * * *